Patented Dec. 16, 1952

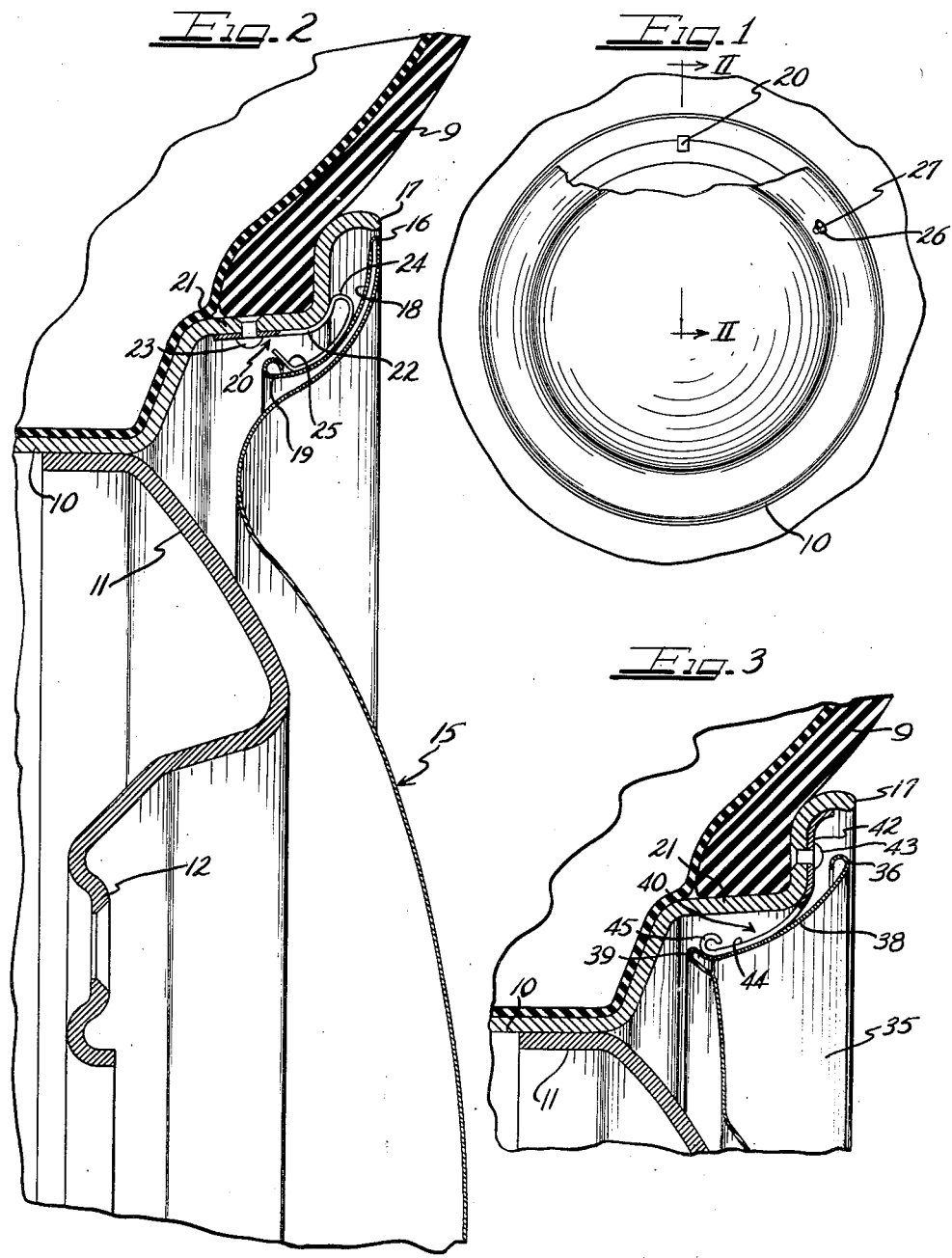

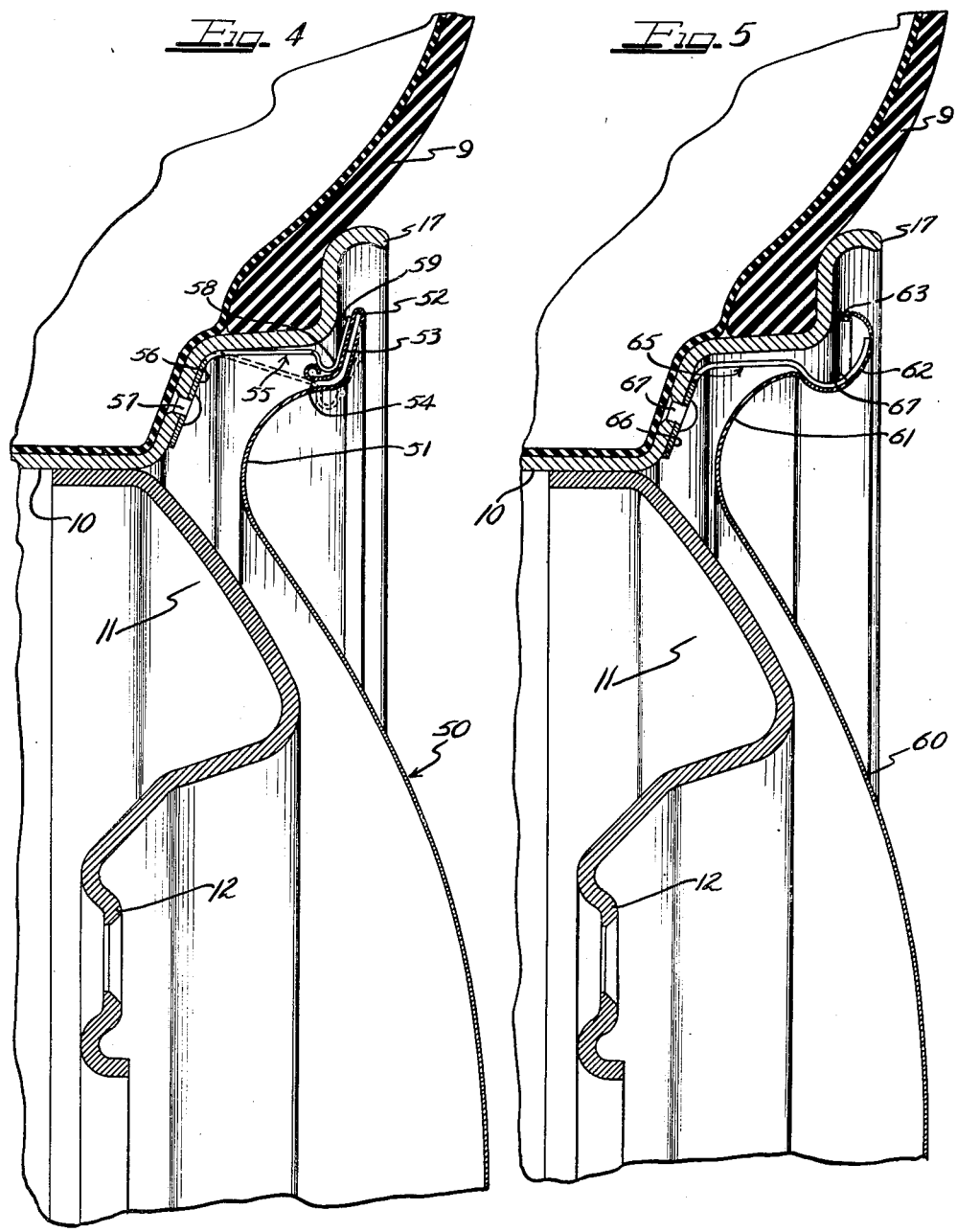

2,621,978

UNITED STATES PATENT OFFICE 2,621,978

WHEEL COVER

George Albert Lyon, Detroit, Mich.

Application October 27, 1948, Serial No. 56,781

7 Claims. (Cl. 301—37)

This invention relates to a wheel cover structure and more particularly to a cover for an automobile wheel.

An object of this invention is to provide a cover as well as means for attaching it to a wheel of such construction that the cover can be floatingly carried on a wheel out of engagement with both the rim and body parts of the wheel.

Yet another object of this invention is to provide a cover which can be easily snapped on to retaining means carried by a wheel and which can be maintained out of contact with the parts of the wheel except for the contact established through the retaining means.

In accordance with the general features of this invention there is provided in a cover structure for a wheel including multi-flanged tire rim and body parts, spring clip means carried by a flange of the rim part and each including a resiliently turned extremity having a shoulder projecting radially inwardly toward the axis of the wheel and a wheel cover comprising a circular member having an annular shoulder of a diameter slightly greater than the inner diameter of a circle common to the shoulders of said clips so as to flex said clips outwardly when the cover is pressed axially into the rim part and formed to snap under and nest in said clip shoulders whereby said clips floatingly carry the cover on the wheel in spaced relation to both the tire rim and body parts.

Other features of the invention relate to the specific construction of the spring clips for floatingly carrying the wheel cover which clips are illustrated in the accompanying specification in a number of different forms.

Other objects and features of this invention will more fully appear from the following detailed description taken in connection with the accompanying drawings which illustrate several embodiments thereof and in which:

Figure 1 is a fragmentary side view of a wheel cover embodying my invention applied to a wheel and showing a portion of the cover broken away to illustrate one of the clips;

Figure 2 is an enlarged fragmentary cross-sectional view taken through the structure of Figure 1;

Figure 3 is a fragmentary cross-sectional view similar to Figure 2, but illustrating a modification of the invention;

Figure 4 is a fragmentary cross-sectional view similar to Figure 2, illustrating a third form of the invention, the dotted lines showing the position of a spring clip prior to engagement by the cover; and Figure 5 is a fragmentary cross-sectional view similar to Figure 2, illustrating still another form of the invention.

As shown on the drawings:

In the accompanying illustrations the wheel in each instance is substantially of conventional construction with the exception of the cover retaining spring clips carried thereby. For this reason I have used the same reference numerals in all forms of the invention on the parts of the wheel that are common to the different illustrations.

In each instance the reference character 9 designates generally the conventional pneumatic tube and tire assembly mounted in the usual way upon a multi-flanged drop center type of tire rim 10. The tire rim is in turn carried by the wheel body or spider part 11 including the usual central bolt-on flange 12 by means of which the wheel may be detachably bolted to a part on an axle or the like in the usual way.

In the form of the invention illustrated in Figures 1 and 2 the cover of my invention is designated generally by the reference character 15 and comprises a dished metallic stamping. As is the case in all modifications of the invention the cover is preferably made from thin sheet material such, for example, as stainless steel or other steel sheet capable of having a high lustrous external finish.

The cover 15 is generally of a dished configuration and is of a diameter less than the outermost diameter of the rim part so that the cover can fit inside of the flange 17 of the rim. The outer edge of the cover 15 is turned at 16 inside of the outer flange 17 of the rim part.

The turned outer edge 16 of the cover terminates in a curved rear flange 18 disposed behind the body of the cover so as to be concealed thereby. This flange extends generally radially and axially into the wheel and terminates in an annular shoulder 19 which comprises a turned edge formed on the extreme outer edge of the disk going to make up the cover 15.

The turned cover edge or shoulder 19 is co-operable with a plurality of resilient spring steel clips 20 which may be of any suitable number such, for example, as 3 to 5. Each of these clips includes a leg 21 fastened to an axial flange 32 of the rim 10 by a rivet 23. In addition, each clip includes a radially outwardly turned goose-neck portion 24 which closely hugs and bears against a corner of the rim flange. In reality the goose-neck portion 24 of each clip comprises the bight of a U-shaped configuration in which one leg is the leg 22 and the other leg terminates in an angular free extremity 25.

This angular extremity 25 is spaced from the flange 21 so that it can yield radially outwardly when engaged by the cover shoulder 19 and against the backing afforded by the rim flanges.

The cover shoulder 19 is of a diameter slightly less than that of a circle common to the angular extremities 25 prior to the engagement of the clips by the cover shoulder. As a consequence, the angular extremities will flex radially outwardly when engaged by the cover shoulder 19 so that even after the shoulder passes over the extremities to the rear of the same, it will still be yieldably engaged by the free extremities of the spring clips.

The foregoing arrangement is such that the cover 15 is yieldably suspended in floating condition on the wheel when carried by the clips and out of contact with the wheel except for engagement with the clips.

In the application of this cover, as in all other forms, a hole 27 in the cover (Figure 1) is first aligned with the usual valve stem 26 and then the cover is pushed axially into the wheel until the shoulder 29 snaps under and behind the free extremities 25 of the clips.

In all forms the cover is easily disengageable from the wheel by inserting a pry-off tool under its outer edge and forcibly disengaging it from the spring clips.

In the modification shown in Figure 3 the sheet metal cover 35 has a turned outer edge 36 radially inwardly of the rim flange 17. An intermediate portion of the cover is doubled upon itself at 39 to provide an annular shoulder engageable with the free extremities of spring clips 40.

These clips 40 each include a leg 42 fastened by a rivet 43 to a rim flange. In addition each clip includes a radially and axially inwardly projecting free leg terminating in an angular or turned end 45.

The use and operation of this form of cover is substantially the same as in the first form.

In Figure 4 the cover is designated generally by the reference character 50 and includes a dished intermediate portion 51 terminating in a turned angular edge 52 formed by turned back portion 53 on the rear side of the outer margin of the cover. This turned back portion 53 has an axially extending turned edge or shoulder 54 cooperable with spring clips 55.

Each clip 55 includes a leg 56 fastened by a rivet 57 to a flange of the rim part 10, as well as a yieldably free leg terminating in a gooseneck angular extremity 58 cooperable with the cover shoulder 54. The outermost end 59 of the clip is inclined at an angle corresponding to that of the turned portion 53 so that when the cover is on the clips this portion 59 rests against the back of the cover.

I have shown by dotted lines the position of the clip prior to its engagement by the shoulder 54. As in the other forms, the free yieldable extremities of the clips will move radially outwardly when engaged by the cover shoulder so that they are under tension when in retaining engagement with the cover shoulder. This form of the invention also operates in substantially the same way as the other two forms.

In Figure 5 the sheet metal cover 60 has a dished portion 61 terminating in a channelled outer marginal portion 62 having a turned outer edge 63 inwardly of the rim flange 17. This channel portion 62 defines a shoulder for engagement with spring clips 65.

Each spring clip 65 includes a leg 66 fastened by a rivet 67 to a flange of the rim part 10. In addition the clip includes a yieldably free extremity formed into a curved goose-neck like shape conforming generally to the cross-sectional contour of the cover channel or shoulder 62.

Thus, when the cover 60 is pressed axially into the wheel the free extremities of the spring clips will snap into and nest inside the cover channel or shoulder 62 to floatingly support the cover on the wheel.

I claim as my invention:

1. In a cover structure for a wheel including multi-flanged tire rim and body parts, spring clips carried by a flange of the rim part and each including a resilient turned extremity having a shoulder projecting radially inwardly toward the axis of the wheel and a wheel cover comprising a circular member having an annular shoulder of a diameter slightly greater than the inner diameter of a circle common to the shoulders of said clips so as to flex said clips radially when the cover is pressed axially into the rim part and formed to snap under and nest in said clip shoulders whereby said clips floatingly carry the cover on the wheel in spaced relation to both the rim and body parts, said annular shoulder being formed on the inner edge of an underturned flange on the outer margin of the cover member inclined radially and axially outwardly and each of said clips having an inclined end portion adapted to bottom against said turned cover flange.

2. In a cover structure for a wheel including multi-flanged tire rim and body parts, spring clips carried by a flange of the rim part and each including a resilient turned extremity having a shoulder projecting radially inwardly toward the axis of the wheel and a wheel cover comprising a circular member having an annular shoulder of a diameter slightly greater than the inner diameter of a circle common to the shoulders of said clips so as to flex said clips radially when the cover is pressed axially into the rim part and formed to snap under and nest in said clip shoulders whereby said clips floatingly carry the cover on the wheel in spaced relation to both the rim and body parts, said annular shoulder comprising an annular channel portion in the outer margin of the cover and which portion is channeled radially toward the axis of the wheel, and said turned extremity of each clip being of a shape complementary to the cross-sectional shape of the channel portion so as to bear directly and supportingly in nested relation therein when the cover is pressed onto the clips.

3. In a cover structure for a wheel including multi-flanged tire rim and body parts, spring clips having portions for attachment to a flange of the rim part and each including a resilient cover carrying head of generally loop form having thereon adjacent generally radially and axially inwardly facing and generally axially outwardly and radially inwardly facing respective shoulders normally biased by the resilience of the head in a radially inward direction, and a cover member for substantially completely covering the outer side of the wheel including the body and rim parts and having adjacent to the margin thereof generally radially outwardly and axially outwardly facing and radially outwardly and axially inwardly facing adjacent shoulders substantially complementary to the shoulders of the clip heads and disposed on diameters larger than the normal biased diameters of the spring shoulders and engaging the spring head shoulders under tension whereby the cover is supported against axial displacement, all parts of the cover being supported by the clips out of contact with all parts of the wheel so that the cover is floatingly carried by the clips as permitted by the resilience of the clip heads.

4. In a cover structure for a wheel including multi-flanged tire rim and body parts, spring clips having portions for attachment to a flange of the rim part and each including a resilient cover carrying head including adjacent generally radially and axially inwardly facing and generally axially outwardly and radially inwardly facing respective shoulders normally biased by the resilience of the head in a radially inward direction, and a cover member for substantially completely covering the outer side of the wheel including the body and rim parts and having adjacent to the margin thereof generally radially outwardly and axially outwardly facing and radially outwardly and axially inwardly facing adjacent shoulders substantially complementary to the shoulders of the clip heads and disposed on diameters larger than the normal biased diameters of the spring shoulders and engaging the spring shoulders under tension whereby the cover is supported against axial displacement, all parts of the cover being supported by the clips out of contact with all parts of the wheel so that the cover is floatingly carried by the clips as permitted by the resilience of the clip heads, said cover shoulders being on an underturned marginal flange extending generally radially and axially inwardly and having its inner edge turned into a reinforcing and shoulder bead.

5. In a cover structure for a wheel including multi-flanged tire rim and body parts, spring clips having portions for attachment to a flange of the rim part and each including a resilient cover carrying head of generally loop form having thereon adjacent generally radially and axially inwardly facing and generally axially outwardly and radially inwardly facing respective shoulders normally biased by the resilience of the head in a radially inward direction, and a cover member for substantially completely covering the outer side of the wheel including the body and rim parts and having adjacent to the margin thereof generally radially outwardly and axially outwardly facing and radially outwardly and axially inwardly facing adjacent shoulders substantially complementary to the shoulders of the clip heads and disposed on diameters larger than the normal biased diameters of the spring shoulders and engaging the spring head shoulders under tension whereby the cover is supported against axial displacement, all parts of the cover being supported by the clips out of contact with all parts of the wheel so that the cover is floatingly carried by the clips as permitted by the resilience of the clip heads, the radially outwardly and axially outwardly facing shoulder of the cover comprising a radially outer wall of an intermediate generally axially inwardly and radially outwardly projecting fold in the cover.

6. In a cover structure for a wheel including multi-flanged tire rim and body parts, spring clips having portions for attachment to a flange of the rim part and each including a resilient cover carrying head of generally loop form having thereon adjacent generally radially and axially inwardly facing and generally axially outwardly and radially inwardly facing respective shoulders normally biased by the resilience of the head in a radially inward direction, and a cover member for substantially completely covering the outer side of the wheel including the body and rim parts and having adjacent to the margin thereof generally radially outwardly and axially outwardly facing and radially outwardly and axially inwardly facing adjacent shoulders substantially complementary to the shoulders of the clip heads and disposed on diameters larger than the normal biased diameters of the spring shoulders and engaging the spring head shoulders under tension whereby the cover is supported against axial displacement, all parts of the cover being supported by the clips out of contact with all parts of the wheel so that the cover is floatingly carried by the clips as permitted by the resilience of the clip heads, said cover shoulders being on inner surfaces of an annular rib of arcuate cross-section on the margin of the cover and with the channel of the rib facing inwardly and having the head portions of the clips nested therein.

7. In a wheel structure including a multi-flanged tire rim and a load-sustaining body portion, a plurality of spring clips secured to said rim and each having a cover supporting head of one piece loop-like form projecting generally radially inwardly flexibly from the tire rim and including on each of the loop-like heads two shoulder portions closely adjacent and respectively facing radially and axially inwardly and radially inwardly and axially outwardly, and a full disk cover for the outer side of the wheel substantially concealing the tire rim and completely concealing the wheel body and having a marginal formation including shoulders generally complementary to the shoulders of the clips and retainingly internested in direct bearing relation with the clip head shoulders, the clip heads supporting all portions of the cover in fully spaced relation to the wheel body and the tire rim so that the cover is floatingly carried by the clips and substantially retained against axial or radial displacement by the clips due to the internested bearing relationship of the clip heads with the marginal formation of the cover.

GEORGE ALBERT LYON.

REFERENCES CITED

The following references are of record in the file of this patent:

UNITED STATES PATENTS

| Number | Name | Date |
|---|---|---|
| 2,239,367 | Lyon | Apr. 22, 1941 |
| 2,265,241 | Lyon | Dec. 9, 1941 |
| 2,386,241 | Lyon | Oct. 9, 1945 |
| 2,397,024 | Lyon | Mar. 19, 1946 |
| 2,410,174 | Lyon | Oct. 29, 1946 |